(12) United States Patent
Amathieu et al.

(10) Patent No.: US 7,591,893 B2
(45) Date of Patent: Sep. 22, 2009

(54) DENSE MORTAR BASED ON BINARY ETTRINGITE BINDER, COMPRISING AT LEAST ONE POLY(ALKYLENE OXIDE) COMB POLYMER AND AT LEAST ONE STRUCTURING ORGANIC RESIN

(75) Inventors: Loris Amathieu, Saint-Laurent-de-Mure (FR); Bruno Touzo, Lyons (FR); Lionel Raynaud, Corbelin (FR); Dina Gauthier, Nievroz (FR)

(73) Assignee: Kerneos, Saint Quentin Fallavier (FR)

( * ) Notice: Subject to any disclaimer, the term of this patent is extended or adjusted under 35 U.S.C. 154(b) by 509 days.

(21) Appl. No.: 10/576,811

(22) PCT Filed: Oct. 22, 2004

(86) PCT No.: PCT/FR2004/050529

§ 371 (c)(1),
(2), (4) Date: Jul. 21, 2006

(87) PCT Pub. No.: WO2005/040062

PCT Pub. Date: May 6, 2005

(65) Prior Publication Data

US 2007/0074642 A1    Apr. 5, 2007

(30) Foreign Application Priority Data

Oct. 23, 2003  (FR)  ................... 03 50728

(51) Int. Cl.
*C04B 16/00* (2006.01)
*C04B 16/04* (2006.01)
(52) U.S. Cl. .................. 106/724; 106/727; 106/728; 106/823; 524/5
(58) Field of Classification Search ................ 106/713, 106/724, 823, 727, 728; 524/5
See application file for complete search history.

(56) References Cited

U.S. PATENT DOCUMENTS 4,084,981 A   4/1978  Higuchi et al.
4,350,533 A   9/1982  Galer et al.

FOREIGN PATENT DOCUMENTS

DE  32 18 446 A1  11/1983
DE  198 08 314 A1  9/1999
FR  2 246 509 A1  5/1975
WO  WO 01/28955 A1  4/2001

*Primary Examiner*—Paul Marcantoni
(74) *Attorney, Agent, or Firm*—Young & Thompson (57) ABSTRACT

A dense mortar includes:
(i) an ettringite binder, including calcium sulphate and a calcium aluminate mineral compound,
(ii) at least one poly(alkylene oxide) comb polymer and,
(iii) at least one organic resin, the organic resin accounting for less than 2% by weight of the mortar.

29 Claims, 5 Drawing Sheets

DENSE MORTAR BASED ON BINARY ETTRINGITE BINDER, COMPRISING AT LEAST ONE POLY(ALKYLENE OXIDE) COMB POLYMER AND AT LEAST ONE STRUCTURING ORGANIC RESIN

This invention relates to a dense mortar based on an ettringite binder, and comprising at least one poly(alkylene oxide) comb polymer (PCP), the dense mortar preferably presenting a water/solids weight ratio lower than 0.5, said binder comprising a calcium aluminates mineral compound and calcium sulphate.

The term "ettringite binder" as used herein is understood to mean a hydraulic binder, the components of which, when hydrated in normal conditions of use, give ettringite as the main hydrate, which is a calcium trisulphoaluminate of the formula $3CaO,Al_2O_3,3CaSO_4.32H_2O$.

The term "solids" as used herein is understood to mean all the dry components of the mortar.

Preferably, the dense mortar according to the invention is obtained by mixing with water in quantities such that the water/solids weight ratio is lower than 0.5.

Lastly the invention relates to the use of a poly(alkylene oxide) comb polymer (PCP) for the formulation of a mortar as defined above.

The ettringite binder comprising a mineral compound of calcium aluminates and calcium sulphate is intended for use in mortars and concrete in a building where a quick return to service is expected. In particular, it makes it possible to constitute products for the repair and preparation of flooring such as screeds smoothing coatings, paving glue.

The quick return to service of structures requires, depending on the applications, reaching a minimum mechanical strength level at a given time and/or a coating time covering defined by the residual moisture in the material. Products for quick return to service are typically prepared from a binder which gives ettringite when hydrated.

In the smoothing coating application, for example, according to the specifications of the Centre Scientifique et Technique du Bâtiment ("Produits et systèmes de préparation de sols intérieurs pour la pose de revêtements de sols minces"—Guide technique pour l'avis technique et le classement P. Cahiers du CSTB, n° 2893—Delivery 370 of June 1996), products must meet at the same time criteria of mechanical performance, adhesion performance and criteria of aptitude for use (paste homogeneity, fluidity (spreading ability diameter of the paste when poured into a 30 mm high ring with a 50 mm diameter) and gelation time).

Apart from the values imposed by the CSTB, quick smoothing coatings must meet at least the following criteria under normal conditions of temperature and hygrometry:

Spreading ability of 150 mm at 7 and 20 min,

Mechanical compression strengths of over 4 MPa at 4 h00,

Period before covering 24 h (3% of residual moisture in the material for application thicknesses of less than 10 mm);

Mechanical compression strengths of over 25 MPa at 28 days.

The chemical reaction for the formation of ettringite is:

$$6Ca^{2+}+2Al(OH)_4^-+3SO_4^{2-}+4OH^-+26H_2O \rightarrow 3CaOAl_2O_3.3CaSO_4.32H_2O$$

The ettringite solubility product at equilibrium is: $K_{ett}=4.9\times10^{-44}$. The rate of formation of ettringite (rate of nucleation and growth of ettringite crystals) depends on several parameters, including the oversaturation coefficient β, which is related to the energy available for forming nuclei:

$$\beta=(a_{ca2+})^{6}*(a_{Al(OH)4-})^{2}*(a_{SO42-})^{3}*(a_{OH-})^{4}/K_{ett}$$

where $a_i$ stands for the activities of ions i.

Ettringite can be obtained by the hydration of compositions comprising calcium aluminates and a source of sulphate, and possibly Portland cement and/or lime which supply the ions in solution required to perform this chemical reaction. Calcium aluminates are combinations of aluminium oxides $Al_2O_3$, represented by A in the cement nomenclature, and of calcium oxide CaO, represented by C in the same notation, these oxides being crystallised particularly under the C3A, C12A7 and CA forms.

In practice today formulations of quick hardening and quick drying mortars comprise a combination of calcium aluminates, calcium sulphate and Portland cement, with proportions of each constituent being difficult to define because the hydration into ettringite has to be controlled, in order to reach the best compromise between the quantity of ettringite formed which guarantees the drying capacity of the product (large quantity of mixing water crystallised into hydrates) and the morphology of this ettringite which, for a given crystal density, guarantees the level of compressive strength and the control of dimensional variations throughout the hardening process and into the long term. This compromise is all the more difficult to achieve because the levels of rate of acquisition of strength that are sought must be compatible with the characteristics of use expected, particularly maintaining the workability hold time.

Such a compromise is not obtained in a satisfactory way in mortars of prior art.

Thus, for example, U.S. Pat. No. 4,350,533 discloses compositions of ettringite cements based on calcium aluminates and calcium sulphate cements, particularly in the form of gypsum, and optionally separately supply lime and Portland cement. But the kinetics of the development of mechanical strengths is much lower than the desired in the present invention.

It is known, for so-called <<Mine Packing>> applications (where it is aimed at filling the recesses occurring in underground structures), to use ettringite mixtures of calcium aluminates and calcium sulphate. But the requirements of the system differ considerably from the <<dense mortar>> applications of the invention: the product should be pumpable, set quickly, but with a water/solid ratio in the order of 5 (the important point in such an application being to create much volume), the mechanical compression strengths at 24 hours do not exceed 5 MPa. Further, the system durability is not a key criterium, neither are the dimensional variations. The existing requirements in <<dense mortar>> applications are such that it is not possible to use such <<mine packing>> solutions directly, they are to be reformulated and adapted to the dense system requirements.

An aim of the invention is therefore to overcome the disadvantages of the prior art providing an ettringite binder comprising calcium sulphate and a calcium aluminate mineral compound, allowing to reach in dense environments the best compromise between the workability hold time and the mechanical strength acquisition kinetics.

Another aim of the invention is to provide mortars with improved mechanical properties. This goal is reached by the use of particular types and proportions of polymers in combination with an ettringite binder.

The ettringite formation directly results from the relative dissolution rates of the soluble components that will determine the proportions between the calcium, aluminium and sulphate ions in the solution. The calcium ion concentration acts at first order on the ettringite formation kinetics; when it is high, the ettringite formation may be very quick, even flash and consequently may occur instantaneously around the anhydrous phases containing the other required ions, i.e. either sulphates or aluminates depending on the case. Such a blocking phenomenon for the reaction interfaces is particularly critical in a dense environment and when there are large deviations between the release rates of the calcium ions of the different soluble substances and/or large deviations between the release rates of the calcium, aluminium and sulphate ions. In order to obtain the desired performance for mortars, and more particularly for dense mortars, early and very quick formation of ettringite around the least soluble grains has to be avoided since such a phenomenon then prevents the normal progress of hydration and leads to a dense mortar which does not meet the specifications, more particularly as far as short term mechanical performances are concerned.

Such a blocking phenomenon for the reaction interfaces is one of the reasons, which explains that the solutions used in a dilute environment are not adaptable to dense environments: in fact, in a dilute environment, the dissolution of the various soluble phases is significantly made easier, reducing the ettringite formation probability upon contact with grains.

Similarly, the conventional ettringite binders, comprising Portland cement and/or lime, calcium sulphate and aluminous cements, do not provide the best hardening kinetics yields. Indeed, the Portland cement comprises calcium sources with very different mineral nature and solubility, such as free lime, C3S, C2S, calcium sulphates, as well as extremely soluble minor substances, such as alkaline sulphates, which modify significantly the solubilization of calcium containing phases. This does not allow for a constant calcium supply throughout the hydration process.

As far as lime is concerned, its too quick dissolution limits the solubilization of aluminate containing phases. Excess lime also has strong consequences on the dimensional variations (very high expansion) and on the morphology of the ettringite being formed, becoming more massive, hence less texturing (mechanical strengths are reduced). Its introduction degree into the mixture is therefore limited, restricting as such the ettringite production yield for a given sulphate or aluminate content, and hence the hardening and quick drying performance.

Similarly, excess of calcium sulphate relative to phases containing calcium aluminates leads to the same effects as lime, i.e. lower mechanical strengths and high dimensional variations. This can be explained partially by the fact that the solubilization of calcium sulphates releases high amounts of calcium into the aqueous phase. This is why compositions comprising calcium aluminate and calcium sulphate phases in stoichiometric proportions (the molar ratio of calcium sulphate/aluminium oxide A is 3) cannot allow for implementing dense mortars with good hardening properties and controlled dimensional variabilities.

Controlling the mortar hydration is thus first subjected to controlling the calcium supply rate relative to other ionic species, and in particular aluminium.

Lastly, it is well known that all the organic components of a mortar composition will also have a direct influence, to a greater or lesser extent, on the kinetics of dissolution of the different mineral phases, and therefore on the efficiency of ettringite formation, the morphology of crystals formed and the microstructure of the final material.

The invention thus relates to a dense mortar which comprises:

(i) an ettringite binder comprising calcium sulphates and calcium aluminates mineral compound, the calcium aluminates mineral compound comprising oxides of calcium C and of aluminium A, which are soluble and combined in one or several crystallised and/or amorphous mineralogical phases, in such proportions that:

the useful C/A molar ratio of the mineral compound of calcium aluminates is in the range of 1.2 to 2.7;

the sum in weight of the useful (C+A) phases represents at least 30% of the total weight of the mineral compound, (ii) at least one poly(alkylene oxide) comb polymer (PCP) and, (iii) at least one structuring organic resin, the mortar containing less than 2% by weight of said structuring organic resin.

The invention will be better understood in the light of the following figures which represent.

The invention relates to a dense mortar which comprises:

(i) an ettringite binder comprised of calcium sulphates and a calcium aluminates mineral compound, (ii) at least one poly(alkylene oxide) comb polymer (PCP) and, (iii) at least one structuring organic resin, the mortar containing less than 2% by weight of said structuring organic resin.

An advantage of the invention is that it allows for a quick return to service of structures, while preserving workability equivalent to that obtained with the mortars of prior art. Thus for formulations containing binders with the same concentration of alumina, the same concentration of binder, and an identical Blaine fineness of calcium aluminate, mechanical resistance is acquired much more rapidly, and the time for re-opening to pedestrian traffic is half as long using mortars produced with the binder according to the invention than using mortars produced with a binder according to prior art.

The combination of the binder with at least one poly(alkylene oxide) comb polymer (PCP) makes it possible to obtain mortars for which the performance in terms of surface hardness when dry or after humidification, wear resistance, and adherence when dry or after immersion in water are substantially higher than those obtained with a casein based mortar, as illustrated respectively in FIGS. 1, 2, 3, 4, and 5.

With the combinations of ettringite binder—PCP according to the invention, the improved properties of the hardened mortar cited herein are obtained with concentrations by weight of structuring polymer in the dry mortar limited to less than 2%.

The mortar according to the invention comprises preferably, at least 0.3% of structuring organic resin, based on the weight of mortar.

Preferably, the mortar according to the invention comprises 0.05% to 0.3% poly(alkylene oxide) comb polymer (PCP) and most preferably, 0.1% to 0.2% of poly(alkylene oxide) comb polymer (PCP) based on the weight of mortar.

Preferably, the dense mortar comprises a structuring organic resin representing 1% by weight of the mortar or less.

As will be shown in the examples, the quantity of structuring resin can be limited to 1% or even 0.5%. However a concentration of over 0.3% is recommended.

The invention provides a mortar presenting preferably at the time of mixing with water a water/solids weight ratio of less than 0.5. The ettringite binder comprises calcium sulphates and a calcium aluminates mineral compound, the aluminates and sulphates and their concentration in the binder being such that the calcium and aluminium ions respectively are released in optimal proportions simultaneously and regularly throughout the hydration process, leading to the formation of ettringite without the early blocking at the dry grains-water interfaces, which hinders the dissolution of dry grains and consequently decreases the efficiency of ettringite formation.

The term useful C and A oxides as used herein is understood to mean C and A oxides which, when they are put in solution, in a mixture with the other chosen components of the mortar composition, including calcium sulphate, give an oversaturation coefficient $\beta > 1$.

The term useful phase, as used herein is understood to mean a phase which releases useful C and A oxides.

Thus, C2AS phases, ferrites, are not useful phases (they are known as "inert phases"). On the contrary, phases C12A7, C3A, glasses, C4A3$ (where $ represents SO3 in the cement industry notation), CA, for example, are useful phases.

The useful molar ratio C/A of calcium aluminates the mineral compound is thus the total molar ratio of all the C and A oxides of the mineral compound of calcium aluminates which are present in the useful phases. In the same way, the sum in weight of the useful phases (C+A) is the sum in weight of the phases comprising oxides C and A, and which are useful phases.

Thus the supply of calcium and aluminium ions in solution continues right throughout the reaction in proportions determined by the useful C/A molar ratio of the mineral compound of calcium aluminates.

The structuring organic resin is preferably chosen from among copolymers of vinyl acetate (EVA), ethylene and vinyl versatates, available for example from the companies Wacker or Elotex, and polyvinyl alcohols (PVA), polymers in solid-liquid dispersion, chosen from among styrene-butadiene dispersions, styrene acrylics, acrylics, vinyl acetates, and vinyl and ethylene versatate, available for example from the company Rohm & Haas.

Preferably, the term "comb polymer" as used herein is understood to mean a polymer composed of a main chain presenting multiple branches each of which is the starting point of a linear or branched side chain. In particular, the term poly(alkylene oxide) comb polymer (PCP) as used herein is understood to mean one or several synthetic polymers chosen from among the copolymers of carboxylic acids and carboxylic esters of poly(alkylene glycol), copolymers of carboxylic acids and poly(alkylene glycol) amide, copolymers of carboxylic acids and poly(alkylene glycol) imide, copolymers of carboxylic acids and vinyl ethers of poly(alkylene glycol), either neutralised or not, and mixtures of these.

More specifically, the polymers include in their structure the units A, B, C, D, E, F, G, H, I with the respective molar fractions a, b, c, d, e, f, g, h, i, where these parameters have the following meanings:

A represents:

B represents:

C represents:

D represents:

E represents:

F represents:

G represents:

H represents:

I represents:

Le symbols have the following meanings, independently from each other, within the same structure, and from one structure to another:

M represents: H, an alkaline earth ion, a NH4+ ion, a primary, secondary or tertiary ammonium ion.
- R1 and R2 represent independently of each other: H or CH3,
- R3 represents: H, or an aliphatic hydrocarbon group comprising from 1 to 20 carbon atoms
- R4 represents: H, an aliphatic hydrocarbon group comprising from 1 to 20 carbon atoms, an aliphatic hydrocarbon ring comprising from 5 to 8 carbon atoms or a substituted aromatic or aryl group comprising from 6 to 14 carbon atoms.
- R5 represents: H, an aliphatic hydrocarbon group, substituted by a hydroxyl group with from 1 to 20 carbon atoms, or poly(alkylene oxides)—(CxH2xO)n-R4, wherein x is comprised between 2 and 4 and n is comprised between 0 and 200.
- R6 represents: H, CH3, a C2-C6 alkyl group, a phenyl, phenyl carboxyl, or phenyl sulphonate group
- m represents: an integer from 0 to 2
- z represents: 0.5 or 1
- n is from 0 to 200 (numerical mean)
- AO=CxH2xO represents an alkylene oxide group comprising of x=2 to x=4 carbon atoms, With: a and/or b and/or c comprised between 0.05 and 0.9; d and/or e and/or f comprised between 0.05 and 0.9; g and/or h comprised between 0 and 0.9; i comprised between 0 and 0.9.

Preferably, PCPs are chosen wherein:

R1, R2 represent: H,

R3 represents: H or CH3,

R4 represents: CH3,

R5 represents: C2H4O (i.e. x=2),

R6 represents a phenyl group, m is 0,

AO represents $C_2H4O$ (i.e. x=2), n is comprised between 16 and 115, and (2a+2b+c+g) is comprised between 0.70 and 0.95, (d+e+h) is comprised between 0.05 and 0.7, f=0, i=0.

Alternatively, PCPs are chosen wherein:

M represents: H, an alkaline ion, a NH4+ ion, a primary, secondary or tertiary ammonium ion.

R1, R2 represents: H,

R3 represents: H, CH3,

R4 represents: CH3,

R5 represents: C2H4O (x=2),

R6 represents: a phenyl group, m is 0,

AO represents C2H4O (i.e. x=2), n is comprised between 16 and 50, and (2a+2b+c+g) is comprised between 0.7 and 0.95, (d+e+h) is comprised between 0.05 and 0.7, f=0, i=0, and the molecular weight of the polymer is comprised between 5000 g/mole and 150000 g/mole.

Alternatively, PCPs are chosen wherein:

M represents: H, an alkaline ion, a NH4+ ion, a primary, secondary or tertiary ammonium ion.

R1, R2 represents: H,

R3 represents: H or CH3,

R4 represents: CH3,

R5 represents: C2H4O (i.e. x=2),

AO represents: C2H4O (i.e. x=2), m is 0, n comprised between 16 and 50, and a=0, b=0, c is comprised between 0.72 and 0.85, (d+e) is comprised between 0.15 and 0.28, f=0, g=0, h=0, i=0, and the molecular weight of the polymer is comprised between 5000 g/mole and 70000 g/mole, and preferably between 5000 and 40000 g/mole.

Alternatively, PCPs are chosen wherein:

M represents: H, an alkaline ion, a NH4+ ion, a primary, secondary or tertiary ammonium ion.

R1, R2 represents: H,

R3 represents: CH3,

R4 represents: CH3,

R5 represents: C2H4O (i.e. x=2),

AO represents: C2H4O (i.e. x=2), m is 0, n comprised between 16 and 50, and a=0, b=0, c is comprised between 0.72 and 0.85, d is comprised between 0.15 and 0.28, e=0, f=0, g=0, h=0, i=0, and the molecular weight of the polymer is comprised between 5000 g/mole and 70000 g/mole, and preferably between 5000 and 40000 g/mole.

The use of a PCP in the mortar rather than casein, which is usually used in these compositions, makes it possible to obtain better performance in terms of hardness, as is illustrated in examples 1, 2 and 3 of compositions according to the invention and the comparative examples 4 to 7. The use of PCP, as a replacement for casein, also makes it possible with a particular choice of structuring polymer to improve the performance of the mortars in terms of surface hardness when dry and after humidification, wear resistance, and adherence when dry and after immersion in water, as illustrated in the examples and in the comments on FIGS. 1 to 5.

Without wanting to be bound by any particular theory, the inventors think that the best performances are obtained thanks to the microstructure of the material obtained: the very dense network of hydrates resulting from the hydration of the ettringite binder defined in presence of the PCP and in absence of a complementary supply of lime in the compositions of the invention, and the very uniform size spread of fine pores reduces the quantity of structuring polymer needed for mechanical strengthening of the hardened material.

Preferably, the structuring organic resin comprises at least one polymer selected from among poly(vinyl acetate), powdered copolymers of ethylene vinyl acetate (EVA), copolymers formed by copolymerisation of 2 or more monomers selected from among ethylene, vinyl acetate, vinyl esters of versatic acids, vinyl chloride, vinyl laurate, styrene, butadiene, alkyl acrylate, alkyl methacrylate, maleic anhydride and its derivatives, and preferably wherein the glass flow temperature Tg is comprised between
20° C. et+35° C. and preferably between 0° C. and 20° C.,
wherein the minimum film formation temperature MFFT is comprised between 0 et+35° C. and preferably between 0° C. and 20° C.,
that can exhibit on their surface the usual elements of formulation of redispersable polymer powders, particularly a protecting colloid preferably comprised of a polyvinyl alcohol and/or of a cellulose ether, and
wherein the mean diameter of elementary particles after redispersion in water is less than 100 μm, and preferably less than 10 μm.

A most preferred mortar comprises 0.2% by weight of mortar of at least one poly(alkylene oxide) comb polymer (PCP) and 1% by weight of mortar, of at least one powdered copolymer of ethylene vinyl acetate (EVA).

This type of binder, which is particularly well adapted to the implementation of levelling coats, is described in more detail in the embodiment examples 1, 2 and 3.

Alternately, the structuring organic resin comprises at least one polyvinyl alcohol (PVA) possibly altered by the inclusion of carboxylic acid groups in its structure.

This type of mortar comprising at least one polyvinyl alcohol (PVA) is well adapted to the implementation of surface coatings, and gives higher performance in surface hardness properties than mortars of prior art comprising redispersable powders (EVA) and casein combined with lime, as will become clearer on reading the examples.

The term polyvinyl alcohol as used herein is understood to mean the molecular structures represented in diagram form below, that is typical polyvinyl alcohols (m=0) and those which can possibly be altered by including carboxylic acids groups in their structure (m different from 0), of which one possible example is given in the diagram above.

Polyvinyl alcohol is characterised by its hydrolysis rate (n/(n+p)) and its molecular weight, the latter of which can be measured indirectly by measuring the viscosity at 20° C. of a 4% by weight solution of PVA in water, expressed in mPa·s and determined according to the rules of the art.

Preferably the polyvinyl alcohols according to the invention have a hydrolysis rate between 70% and 98%, and a melt index between 3 and 35, preferably a hydrolysis rate between 70% and 92%, and a melt index between 3 and 28.

A most preferred dense mortar comprises 0.2% by weight of mortar of at least one poly(alkylene oxide) comb polymer (PCP) and 1% by weight of mortar of at least one polyvinyl alcohol (PVA).

Because of the alkaline hydrolysis reactions polyvinyl alcohols can only be used at high concentrations (e.g. 1%) if no complementary lime is added in the composition of the binder material. So the ettringite binder makes it possible to use this family of polymers at this concentration, which was not possible with the calcium aluminate/calcium sulphate/lime ternary ettringite compositions of prior art.

Preferred compositions of mortars comprising the combination of a PCP and a resin of the PVA type are given in examples 8, 9, 10 and 11.

Preferably the weight ratio of calcium aluminates the mineral compound/calcium sulphate is comprised between 0.5 and 4, and more preferably between 1.5 and 3. More preferably, the calcium sulphate/aluminium oxide A molar ratio in the ettringite binder is comprised between 0.5 and 2.

According to a preferred embodiment, the useful C/A molar ratio of the calcium aluminates mineral compounds in the ettringite binder is comprised between 1.3 and 2.5, and more preferably between 1.6 and 2.

Moreover, advantageously, the calcium sulphate/aluminium oxide A molar ratio in the ettringite binder is comprised between 0.6 and 1.8, preferably between 0.8 and 1.7.

According to a preferred embodiment, the water/solid weight ratio of the dense mortar containing the ettringite binder at the time of mixing with water is less than 0.5.

The ettringite binder according to the invention makes it possible to obtain excellent ettringite formation yields and therefore, a good hardening kinetics without requiring, for the mortar formulation, any complementary source of calcium ions. Another advantage when omitting such a complementary calcium source, which can be either lime, or Portland cement, is that mortar compositions are obtained having more regular performance on the important criteria of the application, Portland cement having in particular a quite variable minor species content, the impact of which on the ettringite formation is decisive.

Thus, preferably, mortars comprising the ettringite binder according to the invention do not comprise either Portland cement or hydraulic lime. They can nevertheless tolerate a low percentage of hydraulic lime and/or Portland cement, within a limit of 3.5% in weight based on the total weight of dry mortar.

According to a preferred embodiment, the sum in weight of the useful phases (C+A) accounts for at least 50% in weight of the total weight of the calcium aluminate mineral compound.

The calcium aluminate mineral compound included in the binder used for formulating the mortar could be obtained through baking aluminium A oxide rich materials, including bauxites, and chalk, in an oven with a temperature higher than 1100° C. It could be obtained under the form of one or more molten or sintered clinkers able to contain crystallized phases or amorphous phases or result from a mixture of various mineral compounds comprising calcium aluminates, obtained in turn through baking or not. The oven to be used can be any oven conventionally used for manufacturing clinkers, such as reverberating furnaces, tunnel furnaces, rotary furnaces or electrical furnaces, either with induction or electric arc.

The calcium aluminate mineral compound could be under the form of a crystallized mineralogical phase selected amongst CA, C12A7, C3A, C4A3$ or under the form of an amorphous phase, or under the form of a mixture of at least one of said crystallized mineralogical phases and an amorphous phase. Preferably, the mineral compound comprises at least 30% in weight of C12A7, more preferably at least 50% in weight of C12A7, much more preferably 50% to 85% in weight of C12A7, based on the total weight of the mineral compound.

The calcium aluminate mineral compound can also comprise at least one crystallized mineralogical phase selected amongst C2A(1−x)Fx, C2S, C2AS, C3S and the mixtures thereof, where F and S respectively stand for $Fe_2O_3$ and $SiO_2$ according to the cement nomenclature, and where x is an integer belonging to ]0; 1].

The calcium aluminate mineral compound could be ground and can then have a Blaine specific area higher than or equal to 1500 cm$^2$/g, preferably ranging from 2000 to 5000 cm$^2$/g.

The calcium sulphate that is appropriate for the binder can originate from anhydrides, gypsum, hemihydrates and mixtures of these, preferably gypsum, hemihydrates and mixtures of these.

The binder comprising the mineral compound of calcium aluminates according to the invention makes it possible to obtain, after addition of aggregates and additives, a dry mortar, then a dense mortar after adding water in order to obtain a water/solid weight ratio of less than 0.5.

The dense mortar according to the invention further comprises:

chalk fillers or siliceous sands: from 25 to 85% by weight based on the total weight of dry mortar, lime and/or Portland cement: from 0% to 3.5% by weight based on the total weight of dry mortar, complementary rheological additives and/or setting regulating additives.

Preferably, the dense mortar according to the invention comprises:

chalk fillers or siliceous sands: from 50 to 80% by weight based on the total weight of dry mortar, lime and/or Portland cement: from 0% to 0.5% by weight based on the total weight of dry mortar, complementary Theological additives and/or setting regulator additives.

The purpose of the complementary rheological additives is to improve the starting rheology of the mixed mortar; these can be casein or water-soluble polymers, the function of which is to limit the segregation, such as cellulose ethers, but also welan gums and polysaccharides. These preferably represent 0.1 to 0.5% of the total weight of dry mortar.

The setting regulator additives can be setting accelerators or setting retarders. These preferably represent 0.1 to 0.5% of the total weight of dry mortar. Preferably, tartaric acid can be used, in combination with sodium gluconate as a setting retarder.

The dry mortar according to the invention makes it possible to obtain a moist mortar by mixing with water. Preferably, the quantity of water is such that the water/solid weight ratio is less than 0.5.

Another object of the invention is the use of an ethylene polyoxide polycarboxylate (PCP) for the formulation of a mortar according to the invention.

The invention is illustrated by the following examples which give more details.

In all the examples, the useful C/A ratio is a molar ratio; the useful percentage (C+A) is expressed in weight compared with the total weight of the mineral compound; the calcium sulphate/$Al_2O_3$ ratio is a molar ratio; the quantity of mixing water is given in percentage by weight compared with the total weight of dry components of the mortar.

EXAMPLE 1, 2, 3

Comparative 4, 5, 6, 7

Smoothing coatings are produced with mineral compounds of calcium aluminates and calcium sulphates according to the invention. The compositions of the tests 1 to 6 are given in Table 1.

To make the comparison easier, the resin and PCP compositions are given in Table 2, and the performance of mortars of prior art and mortars of the invention are given in Table 3. In Table 1 the total quantity, by weight, of alumina in the binder appears.

TABLE 1

| | Test N° | |
|---|---|---|
| | Tests 1-11 excluding 7 | Test 7 |
| Calcium aluminates compound (SSB: 2800 cm$^2$/g): | | |
| useful C/A | 1.77 | 1 |
| useful (C + A) (%) | 55 | 55 |
| majority phases | C12A7 | CA |
| quantity (% by weight) | 20 | 20 |
| Complementary source of calcium ions | | |
| type | — | Portland cement |
| quantity (% by weight) | — | 4 |
| % of total alumina | 8 | 8.1 |
| Calcium sulphate (% by weight) | 9 | 7 |
| Durcal 2 (% by weight) | qsp 100* | |
| Durcal 40 (% by weight) | 18 | |
| Sifraco MA37 (% by weight) | 6.9 | |
| Sifraco CV32 (% by weight) | 26.5 | |
| Durcal 15 (% by weight) | | qsp 100* |
| Durcal 130 (% by weight) | | 10 |
| Sifraco NE14 (% by weight) | | 36 |
| Li2CO3 (% by weight) | 0.05 | 0.05 |
| Citric acid (% by weight) | — | |
| Tartaric acid (% by weight) | 0.07 to 0.18 | 0.07 |
| Cellulose ether Wolf Walsrode MT 400PFV (% by weight) | cf. table 2 | 0.06 |
| Dehydran 1922 (% by weight) | 0.1 | 0.1 |
| K2SO4 (% by weight) | — | 0.2 |
| Casein (% by weight) + lime (% by weight) | cf. table 2 | 0.5 + 0.4 |
| Sodium gluconate (% by weight) | — | 0.04 |
| Poly(alkylene oxide) comb polymer (% by weight), | cf. table 2 | — |
| Structuring polymer (% by weight) | cf. table 2 | 3.5 |
| Mixing water | 24 | 24 |

*qsp: quantity sufficient for making up to 100% with all the dry components of this table, taking into account the concentrations of poly(alkylene oxide) comb polymer (PCP) and structuring polymer.
Calcium sulphate: 95% pure hemihydrate.
Portland cement CPA CEM I 52.5 CP2.
Durcal 2: calcium carbonate marketed by OMYA
Durcal 40: calcium carbonate marketed by OMYA
Durcal 15: calcium carbonate marketed by OMYA
Durcal 130: calcium carbonate marketed by OMYA
Sifraco NE 14: silicon sand marketed by Sifraco
Sifraco MA 37: silicon sand marketed by Sifraco
Sifraco CV 32: silicon sand marketed by Sifraco The concentrations and characteristics of the poly(alkylene oxide) comb polymers and the structuring polymers are given in the tables of examples that follow.

TABLE 2

|  | Invention | | | Comparison | | | |
| --- | --- | --- | --- | --- | --- | --- | --- |
| test | 1 | 2 | 3 | 4 | 5 | 6 | 7 |
| Structuring resin | EVA | EVA | EVA | EVA | EVA | EVA | EVA |
| Type of resin | RE 523Z | EV 2000 | RE 523Z | RE 523Z | EV 2000 | EV 2000 | RE 523Z |
| Quantity (%) | 1 | 1 | 1.9 | 1 | 1 | 3 | 3.5 |
| Cellulose ether (%) | 0.08 | 0.08 | 0.04 | 0.04 | 0.04 | 0.04 | 0.06 |
| PCP | PCPa | PCPa | PCPb | Casein and lime | Casein and lime | Casein and lime | Casein and lime |
| Quantity PCP (%) | 0.2 | 0.1 | 0.15 | 0.5 + 0.45 | 0.5 + 0.45 | 0.5 + 0.45 | 0.5 + 0.45 |

EV 2000 is a resin marketed by Elotex. It is a copolymer based on ethylene—vinyl acetate—vinyl versatate with MFFT=5° C., with a surface protector colloid of the polyvinyl alcohol type, and a mean particle size after redispersion comprised between 0.5 and 8 microns.

RE523Z is a resin marketed by Wacker. It is a vinyl and ethylene acetate copolymer with MFFT=4° C., with a surface protector colloid of the polyvinyl alcohol type, and a mean particle size after dispersion comprised between 0.5 and 8 microns.

PCPa is a poly(alkylene oxide) comb polymer defined, by reference to the units A, B, C, D, E, F, G, H, I described above, and wherein, R1, R2 represents: H, R3 represents: CH3

R4 represents: CH3

R5 represents: C2H4O (x=2)

m is 0,

AO═C2H4O (i.e. x=2), n is comprised between 19 and 25.

and a=0, b=0, c is comprised between 0.72 and 0.78, d is comprised between 0.22 and 0.28, e=0, f=0, g=O, h=0, i=0, and the mean molecular weight is comprised between 8000 g/mole and 40000 g/mole.

PCPb is a poly(alkylene oxide) comb polymer defined by reference to the units A, B, C, D, E, F, G, H, I described above, and wherein, R1, R2 represents: H, R3 represents: CH3

R4 represents: CH3

R5 represents: C2H4O (x=2)

M is 0,

AO═C2H4O (i.e. x=2), n is comprised between 40 and 50.

and a=0, b=0, c is comprised between 0.78 et 0.82, d is comprised between 0.18 and 0.22, e=0, f=0, g=0, h=0, i=0.

and wherein the mean molecular weight is comprised between 10000 g/mole and 40000 g/mole.

The properties of the compositions according to the invention (tests 1, 2 and 3) have been compared with levelling coats either produced with the binary ettringite binder combined with casein+lime (4, 5, 6) or produced with typical known ternary ettringite binders (7). The results are summarised in Table 3.

TABLE 3

|  | Invention | | | Comparison | | | |
| --- | --- | --- | --- | --- | --- | --- | --- |
| Test N° | 1 | 2 | 3 | 4 | 5 | 6 | 7 |
| Self-spread 7 min (mm) | 153 | 152 | 155 | 156 | 148 | 140 | 155 |
| Self-spread 20 min (mm) | 154 | 155 | 155 | 146 | 141 | 110 | 152 |
| Gelation time (min) | 28 | 35 | 34 | 32 | 30 | 28 | 37 |
| Start of setting (min) | 34 | 39 | 39 | 60 | 55 | 55 | 55 |
| End of setting (min) | 40 | 45 | 47 | 70 | 70 | 65 | 65 |
| Rc 2h00 (MPa) | 8.5 | 7.2 | 6.4 | 14.4 | 14.7 | 13.8 | 1 |
| Rc 28 days (MPa) | 39 | 38.8 | 40.6 | 37 | 39.2 | 44.8 | 37.6 |
| Rf 28 days (MPa) | 6.4 | 6.3 | 7.2 | 7.1 | 7.5 | 11 | 6.2 |
| Adherence (Mpa) | 2.2 | 2.2 | 2.8 | 1.7 | 2.4 | 2.9 | 2.1 |
| Adherence after action of water (Mpa) | 2.7 | 2.4 | 2.9 | 1.6 | 1.4 | 1.4 | 1.8 |
| Brinell hardness, kg/cm$^2$ | 1208 | 1524 | 1350 | 557 | 516 | 692 | 700 |
| Brinell hardness after humidifying, kg/cm$^2$ | 1468 | 1629 | 1650 | 509 | 548 | 736 | 550 |

TABLE 3-continued

|  | Invention | | | Comparison | | | |
| --- | --- | --- | --- | --- | --- | --- | --- |
| Test N° | 1 | 2 | 3 | 4 | 5 | 6 | 7 |
| Taber wear at 600 revs (loss of mass in grams) | 5.86 | 4.33 | 2.7 | 4.59 | 4.83 | 2.2 | 3.83 |

The gelation time and the self-spread are measured according to the operating protocol described in the technical guide for the technical notification and the P classification. Cahiers du CSTB, n° 2893.

The compressive strength (Rc) and flexion strength (Rf) are measured on 2×2×16 cm test pieces, maintained at 20° C. and 70% humidity. Rc 2 h00 represents the measurement made 2 hours after putting the dry mortar with the mixing water; Rc 28 days is the value obtained after 28 days.

The adherence when dry is measured with a Sattec dynamometer according to the operating protocol described in the technical guide for the technical notification and the P classification. Cahiers du CSTB, n° 2893, on concrete support after 28 days, without key primer, in Mpa. The measurements after action of water are carried out on models conditioned for 7 days in laboratory atmosphere, immersed for 24 hours in water then reconditioned for 7 days in laboratory atmosphere before measuring.

The tests of resistance to wear by abrasion are carried out using a Taber machine (T. Taber Industries, 455 Bryant St., P.O. Box 164, North Tonawanda, N.Y. 14120-9911) described briefly in the standard ASTM D 4060-95. The grinding wheels used have the following characteristics: Calibrade H-22 (diameter 50 mm, band width 13 mm)

A weight of 250 g is applied to each of the two grinding wheels added to which is the weight of the support arm, which is 250 g. Thus the total weight on each wheel is equal to 500 g. The sample is made of a disc with a diameter of 100 mm, 10 mm thick, with a hole drilled in the centre to centre it on the test turntable. The sample is weighed in the test laboratory atmosphere, after being blown with compressed air. The tests are carried out in laboratory atmosphere, i.e. 20° C.-65% Relative Humidity. The grinding wheels are put into contact with the disc, under the pressure of the weights, and the disc undergoes several series of rotations: n revs, then stoppage, dismantling the disc and the grinding wheels, cleaning the grinding wheels and the disc by blowing with compressed air, then weighing the disc. First there are 3 series of 50 revs, followed by a series of 150 revs and a final one of 300 revs. The absolute loss of mass depending on the number of revs makes it possible to evaluate the wear resistance of the material. For the sake of simplicity in the presentation of results, the loss of mass after 600 revs only is indicated in the examples.

The Brinell hardness is determined using a type B microdurometer (Société d'Ajustage et de Mécanique de Précision, 142 bis, rue de Pelleport—75020 Paris). It is calculated from the measurement of the depth of penetration into the material of a steel bead of a known diameter under a given load.

A parallelepipedal sample (100 mm×50 mm×20 mm) is used. The bead diameter is 5.9 mm; the load is selected so as to obtain a penetration comprised between 75 and 100 microns. The load is increased progressively and the depth of penetration is measured using a lens fitted with a reticle integrated into the device. The Brinell hardness R is given by the following relationship:

$$R(kg/cm^2) = (Load - 0.2) * 105 / (\pi * a * D)$$

D: Diameter of bead (in mm)

a: depth of penetration (in μm)

Load applied (in kg)

The result given in the table is the mean of 5 measurements.

The measurement after humidifying the surface is carried out according to the operating protocol described in the technical guide for the technical notification and the P classification. Cahiers du CSTB, n° 2893.

It can be observed that a mortar according to the invention comprising 0.1% to 0.2% of PCP and 1 to 1.9% of EVA resin (tests 1, 2 and 3), has substantially better performance in terms of hardness (when dry and after humidifying) and adherence after the action of water than that obtained from a mortar containing binary ettringite binder but combined with 0.5% of casein+lime based fluidiser and either 1% of structuring polymer (tests 4, 5), or 3% of EVA resin (test 6). The mortar according to the invention, also has better performance than a mortar produced with typical ternary ettringite binders containing of a casein based fluidiser and 3.5% of structuring resin (test 7).

EXAMPLE 8, 9, 10, 11, COMPARATIVE 7

Levelling coats were created the characteristics of which are given in Table 1. The concentrations and types of resins and PCP based fluidisers are given in Table 4.

TABLE 4

| Test | Comparison 7 | Invention | | | |
| --- | --- | --- | --- | --- | --- |
| | | 8 | 9 | 10 | 11 |
| Structuring resin | EVA | PVA | PVA | PVA | PVA |
| Type of resin | RE 523 Z | PVA1 | PVA2 | PVA3 | PVA4 |
| Quantity (%) | 3.5 | 1 | 0.5 | 0.5 | 1 |
| Fluidiser | Casein + lime | PCPa | PCPa | PCPb | PCPb |
| Dosage fluidiser (%) | 0.5 | 0.2 | 0.2 | 0.2 | 0.1 |
| Cellulose ether | ? | 0.04 | 0.04 | 0.04 | 0.04 |

PVA1 is a polyvinyl alcohol with a hydrolysis rate of 70%, wherein the viscosity of a 4% solution at 20° C. is 5.5 mPa · s.
PVA2 is a polyvinyl alcohol with a hydrolysis rate of 96%, wherein the viscosity of a 4% solution at 20° C. is 31 mPa · s.
PVA3 is a polyvinyl alcohol with a hydrolysis rate of 88%, wherein the viscosity of a 4% solution at 20° C. is 23 mPa · s.
PVA4 is a polyvinyl alcohol with a hydrolysis rate of 88%, wherein the viscosity of a 4% solution at 20° C. is 4 mPa · s.

The properties of compositions according to the invention (tests 8 to 11) have been compared to a known levelling coat 7. The results are summarised in Table 5.

TABLE 5

| | Test N° | | | | |
|---|---|---|---|---|---|
| | 7 | 8 | 9 | 10 | 11 |
| Self-spread 7 min (mm) | 155 | 152 | 166 | 150 | 150 |
| Self-spread 20 min (mm) | 152 | 150 | 158 | 153 | 151 |
| Gelation time (min) | 37 | 32 | 35 | 43 | 46 |
| Start of setting (min) | 55 | 39 | 38 | 48 | 52 |
| End of setting (min) | 65 | 47 | 46 | 52 | 58 |
| Rc 2h00 (MPa) | 1 | 5.3 | 6.4 | 6 | 3.5 |
| Rc 28 days (Mpa) | 37.6 | 33.2 | 39.1 | 39 | 37.3 |
| Rf 28 days (MPa) | 6.20 | 10 | 8.50 | 8.7 | 9.6 |
| Adherence at 28 days (MPa) | 2.1 | 2.9 | 2.1 | 2.3 | 2.6 |
| Adherence after action of water (MPa) | 1.8 | 2.4 | 2.6 | 2.6 | 2.6 |
| Brinell Hardness (kg/cm$^2$) | 700 | 1550 | 1800 | 1490 | 1560 |
| Brinell hardness after humidifying (kg/cm$^2$) | 550 | 1200 | 1750 | 1350 | 1200 |
| Taber wear at 600 revs (loss of mass in grams) | 3.83 | 0.63 | 1.16 | 1.3 | 0.96 |

For all the criteria of mechanical properties the performance obtained with PCP levels from 0.1% to 0.2% and concentrations of structuring polymer of the order of magnitude of 0.5 to 1% is remarkable and significantly higher than the performance obtained from prior art characterised by levels of structuring polymer of over 2.5% (3.5% in example 7).

EXAMPLE 12

The total porosity and the developed surface of the pores for mortars 3 and 11 according to the invention, and mortar 7 of prior art were compared in Table 6. These values come from measures carried out after 28 days with a Mercure intrusion porosity meter marketed by Micrometrics Instrument Corporation. The quantity of hydrates in the mortars at 28 days was determined by Differential Enthalpy Analysis (Differential Scanning Calorimetry—Perklin Elmer 7). It is observed that, the combination of binary ettringite binder with a PCP and low concentrations of structuring polymers, is characterised by better hydration efficiency (more hydrates formed) leading to a hardened material with lower porosity than mortars produced according to prior art. This is true although the initial mixing rate of the mortars is identical (water/solids=24%) and could be the origin of the improved mechanical properties of mortars produced according to the invention.

TABLE 6

| | Example n° | | |
|---|---|---|---|
| | 7 | 11 | 3 |
| Total porosity in % | 24.0 | 21.1 | 22.9 |
| Developed surface of pores in m$^2$/g | 10.7 | 5.6 | 6.1 |
| Quantity of hydrates in joules/g | 149 | 192 | 195 |

EXAMPLE 13

The surface hardness when dry (FIG. 1) and surface hardness after humidifying (FIG. 2) are compared for mortars according to the invention (test formulations 1 to 3 and 8 to 11) and casein based mortars in test formulations 4 to 7. It can be seen (FIGS. 1 and 2) that formulations of the invention exhibit greater surface hardness than known mortars, containing a binary or typical ettringite binder, a casein based fluidiser and, for some of them, redispersible powder concentrations higher than 2.5%.

EXAMPLE 14

Figure 1:
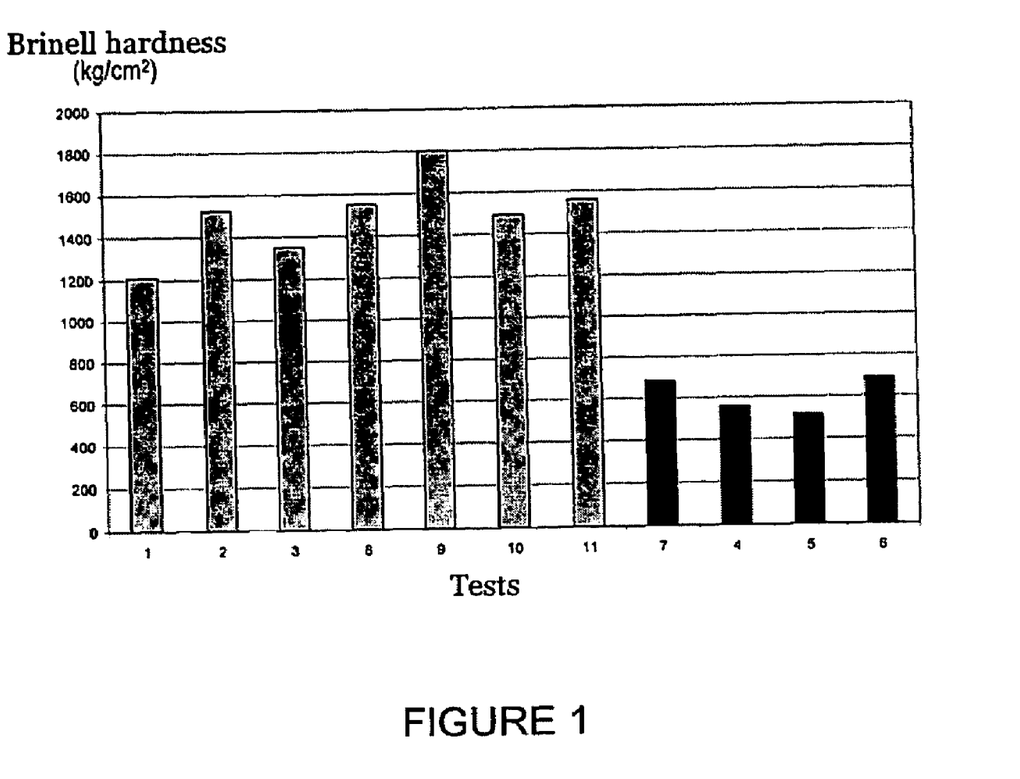
FIGS. 1 and 2: The surface hardness when dry and after humidifying of mortars according to the invention and known mortars.
Figure 2:
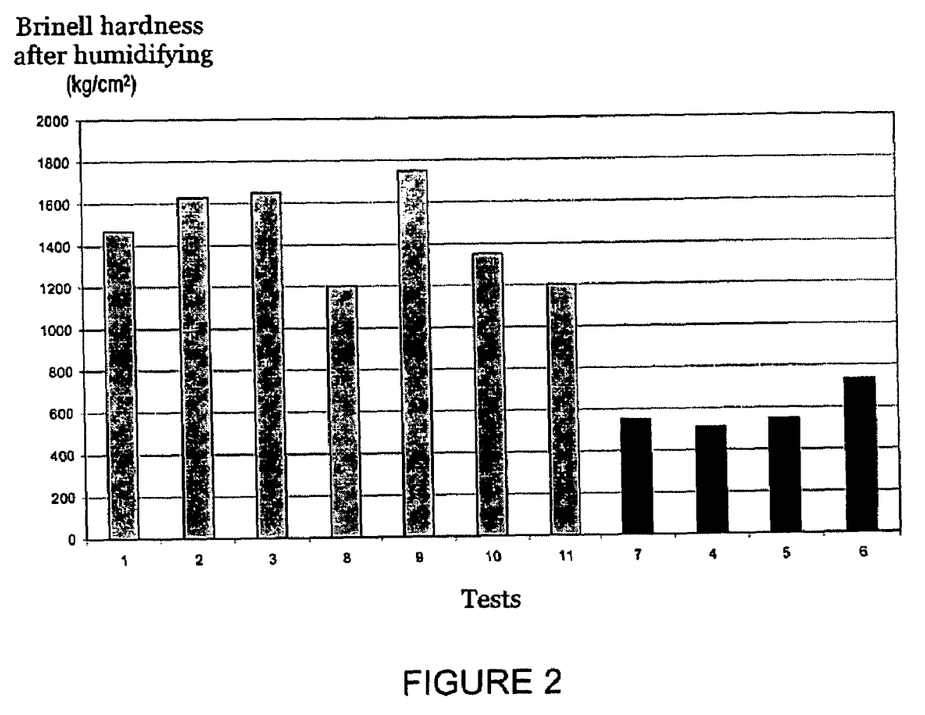
Figure 3:
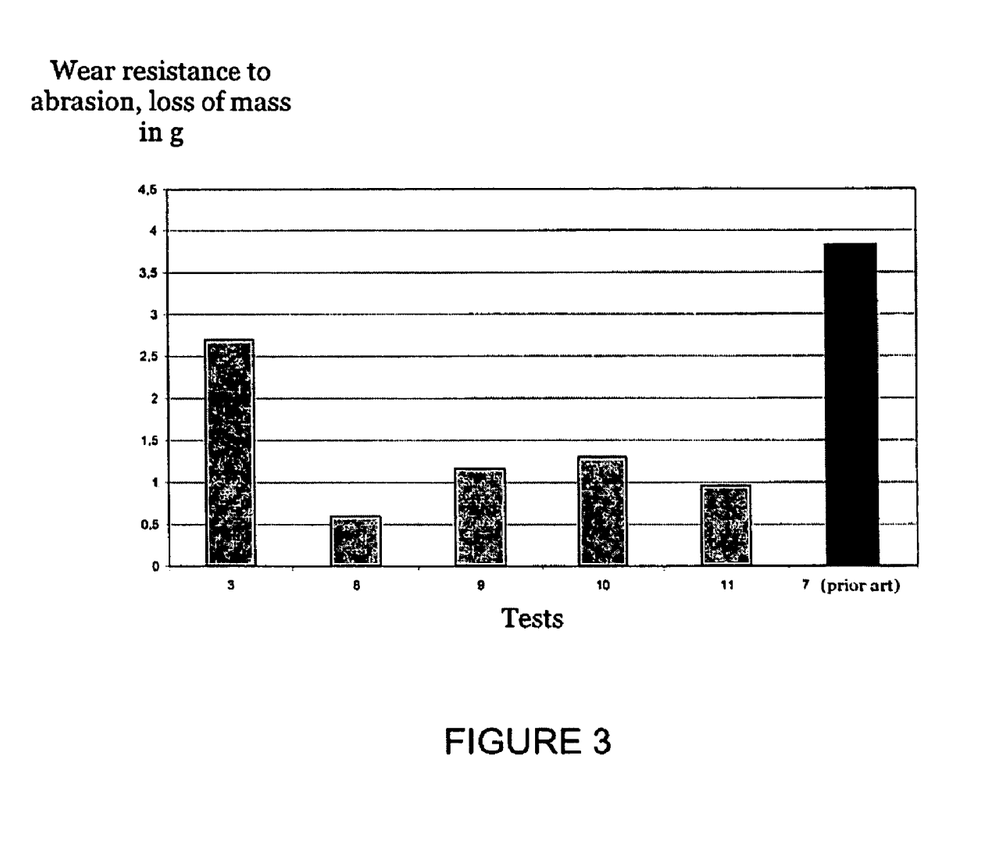
FIG. 3: The wear resistance of mortars according to the invention and known mortars.
Figure 4:
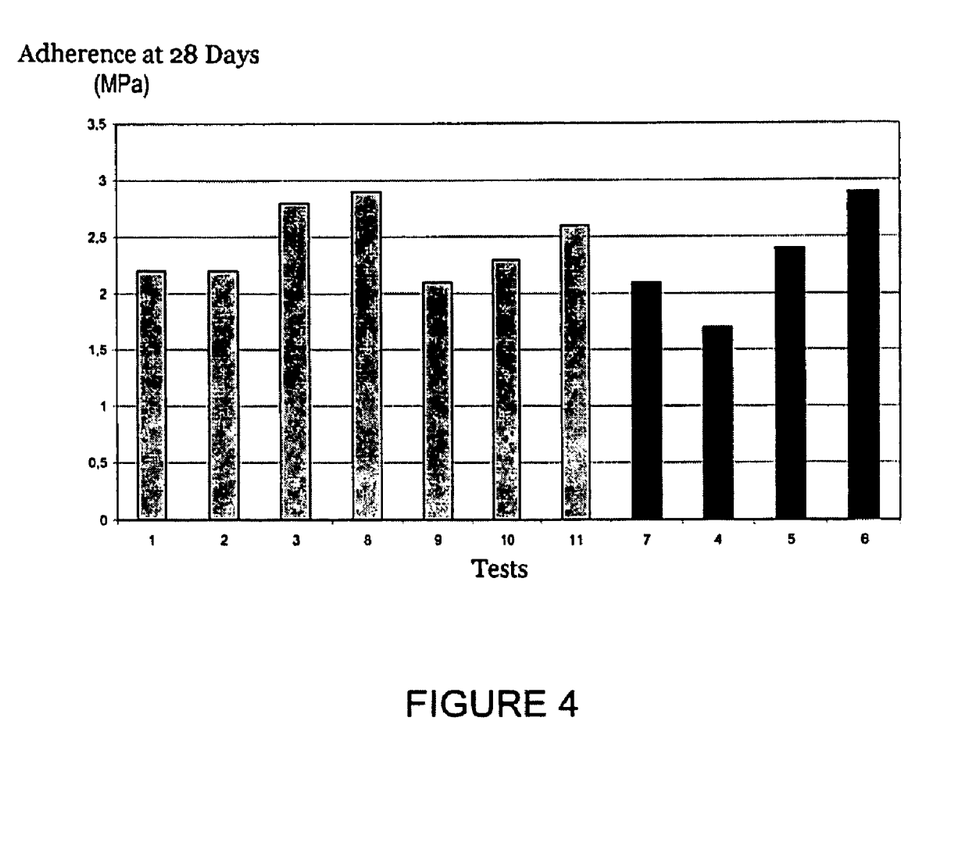
FIGS. 4 and 5: The adherence when dry and after immersion for 24 hours in water of mortars according to the invention and known mortars.
Figure 5:
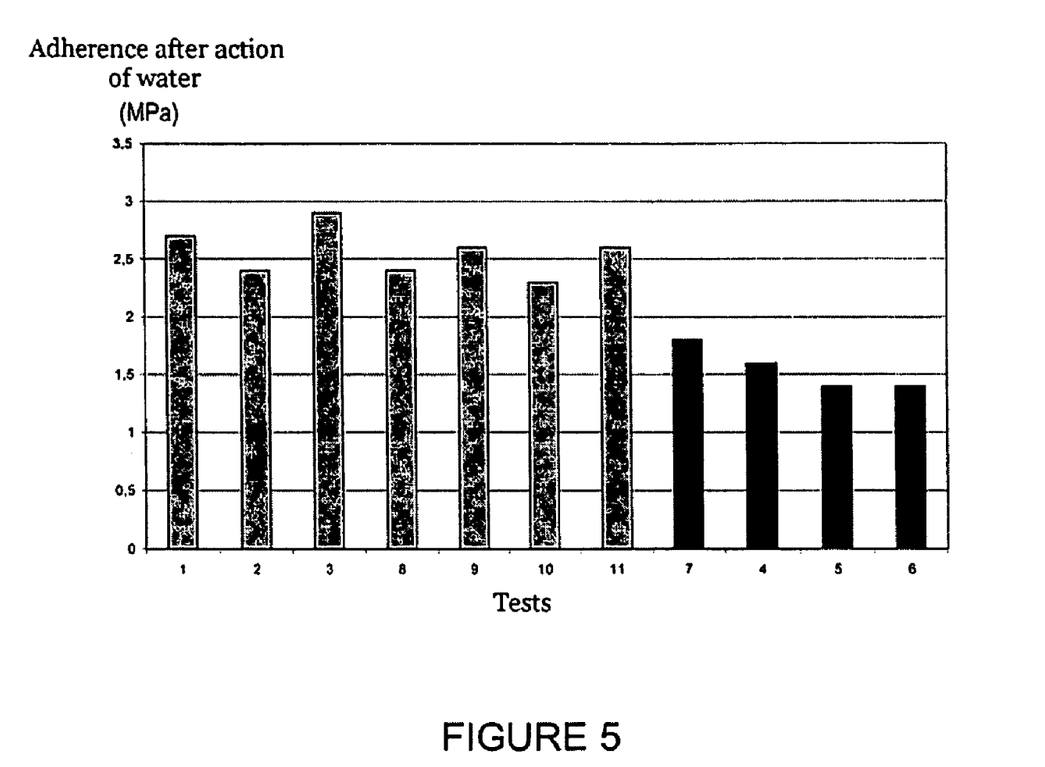

The wear resistance of mortars with test formulations 3 and 8 to 11 was compared to that of known mortars of test formulation 7 (FIG. 3). The more wear resistant the sample tested the lower the loss of mass. It can be seen in FIG. 3, that the loss of mass in (g) at 600 revs, represented on the x axis, of formulations 3 and 8 to 11 is lower than the loss of mass of formulation 7, and this is for polymer concentrations much lower than those for formulation 7.

EXAMPLE 15

The adherence when dry (FIG. 4), and adherence after the action of water (FIG. 5) of mortars of formulations according to the invention 1 to 3 and 8 to 11 were compared with known mortars of test formulations 4 to 7. Formulas of the invention exhibit values of adherence to the support when dry that are equivalent to that of known mortars despite very low concentrations of structuring polymers, and markedly better performance after the action of water.

The invention claimed is:

1. A dense mortar which comprises: (i) an ettringite binder comprising both calcium sulphate and a calcium aluminate mineral compound, the calcium aluminate mineral compound comprising oxides of calcium C and of aluminium A, which are soluble and combined in one or several crystallized and/or amorphous mineralogical phases in such proportions that:
   the useful C/A molar ratio of the calcium aluminates mineral compound is in the range of 1.2 to 2.7;
   the sum in weight of the useful C+A phases represents at least 30% of the total weight of the mineral compound,
   (ii) at least one poly(alkylene oxide) comb polymer and,
   (iii) at least one organic resin, wherein the mortar contains less than 2% by weight of said organic resin.

2. The dense mortar according to claim 1, wherein the mortar comprises at least 0.3% by weight of organic resin, based on the weight of the mortar.

3. The dense mortar according to claim 1, characterised in that wherein the mortar comprises 0.05% to 0.3% of poly (alkylene oxide) comb polymer based on the weight of the mortar.

4. The dense mortar according to claim 1, wherein said organic resin account for 1% by weight of the mortar, or less.

5. The dense mortar according to claim 1, wherein the poly(alkylene oxide) comb polymer is selected from the group consisting of the copolymers of carboxylic acids and carboxylic esters of poly(alkylene glycol), copolymers of carboxylic acids and poly(alkylene glycol) amide, copolymers of carboxylic acids and poly(alkylene glycol) imide, copolymers of carboxylic acids and vinylic ethers of poly (alkylene glycol), and mixtures of thereof.

6. The dense mortar according to claim 1 wherein the organic resin comprises at least one polymer selected from the group consisting of poly(vinyl acetate), powdered copolymers of vinyl and ethylene acetate, copolymers formed by copolymerisation of 2 or more monomers selected from the group consisting of ethylene, vinyl acetate, vinyl esters of versatic acids, vinyl chloride, vinyl laurate, styrene, butadiene, alkyl acrylate, alkyl methacrylate, maleic anhydride and its derivatives.

7. The dense mortar according to claim 6 wherein the mortar comprises 0.2% by weight of the mortar of at least one poly(alkylene oxide) comb polymer, and 1% by weight of the mortar of at least one powdered copolymer of vinyl and ethylene acetate.

8. The A dense mortar according to claim 1, wherein the organic resin comprises at least one polyvinyl alcohol.

9. The dense mortar according to claim 8 wherein the mortar comprises 0.2% by weight of the mortar of at least one poly(alkylene oxide) comb polymer, and 1% by weight of the mortar of at least one polyvinyl alcohol.

10. The dense mortar according to claim 1 wherein the weight ratio of calcium aluminate mineral compound/calcium sulphate within the ettringite binder is between 0.5 and 47.

11. The dense mortar according to claim 1 wherein the molar ratio of calcium sulphate/aluminium oxide A in the ettringite binder is between 0.5 and 2.

12. The dense mortar according to claim 1 wherein the useful C/A molar ratio of the calcium aluminate mineral compound within the ettringite binder is between 1.3 and 2.5.

13. The dense mortar according to claim 1 wherein the molar ratio of calcium sulphate/aluminium oxide A in the ettringite binder is between 0.6 and 1.8.

14. The dense mortar according to claim 1 wherein the mortar exhibits at the time of mixing with water a water/solids weight ratio lower than 0.5.

15. The dense mortar according to claim 1, wherein the mortar does not comprise any Portland cement or hydraulic lime.

16. The dense mortar according to claim 1, wherein the sum in weight of useful C+A phases accounts for at least 50% by weight of the total weight of the calcium aluminates mineral compound.

17. The dense mortar according to claim 1, wherein the calcium aluminate mineral compound is obtained through baking in a furnace at a temperature of over 1100° C., in the form of one or several melted or sintered clinkers that contain crystallised phases or amorphous phases.

18. The dense mortar according to claim 1, wherein the calcium aluminate mineral compound is under the form of a crystallised mineralogical phase selected from the group consisting of CA, C12A7, C3A, C4A3$, or under the form of an amorphous phase, or under the form of a mixture of at least one of said crystallised mineralogical phases and an amorphous phase.

19. The dense mortar according to the claim 18 wherein the calcium aluminate mineral compound contains at least 30% by weight of C12A7 based on the total weight of the mineral compound.

20. The dense mortar according to claim 1 wherein the calcium aluminate mineral compound contains at least one crystallised mineralogical phase selected from the group consisting of C2A(1−x)Fx, C2S, C2AS, C3S, and mixtures thereof, where x is an integer from 0 to 1.

21. The dense mortar according to claim 1 wherein the calcium aluminate mineral compound is ground and exhibits a Blaine surface area greater than or equal to 1500 $cm^2/g$.

22. The dense mortar according to the claim 21 wherein the calcium aluminate mineral compound is ground to a Blaine surface area comprised between 2000 $cm^2/g$ and 5000 $cm^2/g$.

23. The dense mortar according to claim 1, wherein the calcium sulphate is derived from a compound selected from the group consisting of anhydrites, hemihydrates, gypsum and mixtures thereof.

24. The dense mortar according to claim 1, further comprising:
    chalk fillers or siliceous sands: from 25 to 85% by weight based on the total weight of the dry mortar,
    lime and/or Portland cement: from 0% to 3.5% by weight based on the total weight of the dry mortar, and
    rheological additives and/or setting regulating additives.

25. The dense mortar according to claim 24, wherein the mortar comprises:
    chalk fillers or siliceous sands: from 50 to 80% by weight based on the total weight of the dry mortar,
    lime and/or Portland cement: from 0% to 0.5% by weight based on the total weight of the dry mortar, and
    complementary rheological additives and/or setting regulating additives.

26. The dense mortar according to claim 24 wherein the rheological additives account for from 0.1% to 0.5% of the total weight of the dry mortar, and the setting regulating additives account for 0.1% to 0.5% of the total weight of the dry mortar.

27. The dense mortar according to any claim 1 wherein the mortar is obtained by mixing with water in a quantity such that the water/solid weight ratio is less than 0.5.

28. The dense mortar according to claim 8 wherein the polyvinyl alcohol is altered by the inclusion of carboxylic acid groups in its structure.

29. The dense mortar according to claim 1, further comprising Portland cement and/or hydraulic lime at a content of less than 3.5% by weight based on the total weight of dry mortar.

* * * * *

UNITED STATES PATENT AND TRADEMARK OFFICE
CERTIFICATE OF CORRECTION

PATENT NO. : 7,591,893 B2  Page 1 of 1
APPLICATION NO. : 10/576811
DATED : September 22, 2009
INVENTOR(S) : Amathieu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this

Twenty-first Day of September, 2010

David J. Kappos
*Director of the United States Patent and Trademark Office*